(12) United States Patent
Chiba et al.

(10) Patent No.: US 9,772,034 B2
(45) Date of Patent: Sep. 26, 2017

(54) POWER UNIT

(71) Applicant: HONDA MOTOR CO., LTD., Tokyo (JP)

(72) Inventors: Atsushi Chiba, Wako (JP); Tensei Hayashi, Wako (JP); Masazumi Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 14/663,002

(22) Filed: Mar. 19, 2015

(65) Prior Publication Data
US 2015/0276056 A1     Oct. 1, 2015

(30) Foreign Application Priority Data

Mar. 26, 2014  (JP) .................................. 2014-064454

(51) Int. Cl.
| | |
|---|---|
| *F16H 63/30* | (2006.01) |
| *F01M 11/00* | (2006.01) |
| *F16H 57/02* | (2012.01) |
| *F16H 57/04* | (2010.01) |

(Continued)

(52) U.S. Cl.
CPC ......... *F16H 63/30* (2013.01); *F01M 11/0004* (2013.01); *F16H 57/02* (2013.01); *F16H 57/0423* (2013.01); *F01M 11/02* (2013.01); *F01M 2011/0058* (2013.01); *F16H 57/0452* (2013.01); *F16H 63/14* (2013.01); *F16H 2057/0203* (2013.01); *Y10T 74/20177* (2015.01)

(58) Field of Classification Search
CPC ...... F16H 63/30; F16H 57/0423; F16H 57/02; F16H 2057/0203; F16H 63/14; F16H 57/0452; F01M 11/0004; F01M 11/02; F01M 2011/0058; Y10T 74/20177
See application file for complete search history.

(56) References Cited

U.S. PATENT DOCUMENTS

| | | | |
|---|---|---|---|
| 7,174,800 B2 * | 2/2007 | Kawakubo | F16H 63/18 74/325 |
| 7,198,021 B2 * | 4/2007 | Kawakubo | F16H 57/02 123/198 P |
| 9,441,734 B2 * | 9/2016 | Yajima | F16H 63/14 |

(Continued)

FOREIGN PATENT DOCUMENTS

JP     2008-137417 A     6/2008

*Primary Examiner* — Victor MacArthur
(74) *Attorney, Agent, or Firm* — Birch, Stewart, Kolasch & Birch, LLP

(57) ABSTRACT

A power unit having a crankcase and peripheral devices wherein a driving source for a gear shifting device is disposed so as to be displaced below the crankcase. An engine includes a gear speed change mechanism having a plurality of gear pairs for changing the speed of a rotational force of a crankshaft. A gear shifting device includes at least a plate-shaped shift arm rocking about a shift spindle to perform a gear pair changing operation on the gear speed change mechanism. A crankcase houses the gear speed change mechanism and the gear shifting device with an oil pan attached to a lower portion of the crankcase. A communicating hole communicating with the oil pan is formed in a bottom portion of the crankcase with the bottom portion being located below the shift arm, and a rocking range of the shift arm partly overlaps the communicating hole.

10 Claims, 10 Drawing Sheets

(51) Int. Cl.
　　*F01M 11/02*　　　(2006.01)
　　*F16H 63/14*　　　(2006.01)

(56)　　　　　References Cited

U.S. PATENT DOCUMENTS

| | | | | |
|---|---|---|---|---|
| 2005/0081664 | A1* | 4/2005 | Kawakubo | F16H 3/089 |
| | | | | 74/337.5 |
| 2005/0087032 | A1* | 4/2005 | Kawakubo | F16H 63/18 |
| | | | | 74/473.1 |
| 2007/0056551 | A1* | 3/2007 | Nakatsuka | F16H 57/0421 |
| | | | | 123/197.1 |
| 2010/0242893 | A1* | 9/2010 | Negoro | F01M 11/0004 |
| | | | | 123/195 C |
| 2015/0135691 | A1* | 5/2015 | Yajima | F16H 63/14 |
| | | | | 60/323 |

* cited by examiner

POWER UNIT

CROSS-REFERENCE TO RELATED APPLICATIONS

The present application claims priority under 35 USC 119 to Japanese Patent Application No. 2014-064454 filed Mar. 26, 2014 the entire contents of which are hereby incorporated by reference.

BACKGROUND OF THE INVENTION

Field of the Invention

The present invention relates to a power unit. More particularly, to a power unit including a gear shifting device for a saddle riding type vehicle.

Description of Background Art

Japanese Patent No. 4499083, for example, discloses a structure in a conventional saddle riding type vehicle wherein a driving source for actuating a gear shifting device is disposed below a crankcase in a power unit of an internal combustion engine housing the gear shifting device in the crankcase.

In the structure described in Japanese Patent No. 4499083, because the driving source for the gear shifting device is disposed so as to be displaced below the crankcase, the center of gravity can be lowered. When such a driving source for the gear shifting device is disposed so as to be displaced below the crankcase, a structure is adopted in which the gear shifting device and the driving source are separated from each other with a large distance therebetween. Therefore, for example, the power transmission efficiency of the driving source for the gear shifting device and the shape and arrangement of other peripheral parts are affected. Thus, the degree of freedom for the structure and arrangement of the peripheral devices is limited.

SUMMARY AND OBJECTS OF THE INVENTION

The present invention has been made in view of the above-described situation. It is an object of an embodiment of the present invention to provide a power unit that can increase a degree of freedom of the structure and arrangement of a crankcase and peripheral devices in a case where a driving source for a gear shifting device is disposed so as to be displaced below the crankcase.

In order to achieve the above object, according to an embodiment of the present invention, there is provided a power unit including:

an engine;

a gear speed change mechanism including a plurality of gear pairs to change the speed of a rotational force of a crankshaft;

a gear shifting device having at least a plate-shaped shift arm rocking about a shift spindle to perform a gear pair changing operation on the gear speed change mechanism;

a crankcase housing provided for the gear speed change mechanism and the gear shifting device; and an oil pan is attached to a lower portion of the crankcase;

wherein a communicating hole communicating with the oil pan is formed in a bottom portion of the crankcase, the bottom portion being located below the shift arm, and a rocking range of the shift arm partly overlaps the communicating hole.

According to an embodiment of the present invention, a region of the oil pan, the region facing the communicating hole, is formed as a projecting portion projecting rearwardly. The projecting portion has a slope that descends to a storage chamber of the oil pan.

According to an embodiment of the present invention, the power unit further includes a shift actuator transmitting a driving force to the shift spindle wherein the shift actuator is fastened and fixed to a crankcase cover covering a side of the crankcase, and is disposed in a rear of the oil pan.

According to an embodiment of the present invention, as viewed from a side, the shift actuator at least partly overlaps the projecting portion.

According to an embodiment of the present invention, the power unit further includes a plate-shaped baffle plate covering a ceiling surface of the oil pan wherein an opening portion opening in a range overlapping the communicating hole is formed in the baffle plate.

According to an embodiment of the present invention, a clamp member fixing a harness of the shift actuator is jointly fastened to an oil pan fastening portion in a vicinity of the projecting portion.

According to an embodiment of the present invention, a main shaft of the gear speed change mechanism is located below a counter shaft, and the gear shifting device is disposed more rearwardly than a line connecting axes of the main shaft and the counter shaft.

According to an embodiment of the present invention, an oil amount checking device is attached to a clutch cover, and a gage portion of the oil amount checking device is inserted into the communicating hole.

According to an embodiment of the present invention, the shift actuator transmits a driving force to one end portion of the shift spindle via a power transmitting mechanism with a shift spindle sensor that is coupled to another end portion of the shift spindle. The shift spindle sensor is fastened and fixed to the clutch cover covering one end side of the crankcase.

According to an embodiment of the present invention, the communicating hole communicating with the oil pan is formed in the bottom portion of the crankcase which bottom portion is located below the shift arm, and the rocking range of the shift arm partly overlaps the communicating hole. Therefore, the gear shifting device can be disposed nearer to the bottom portion of the crankcase. Thus, the effect of the arrangement of the gear shifting device on the gear speed change mechanism, the engine, and the like can be reduced, so that a degree of freedom of arrangement of the gear speed change mechanism and the engine can be improved.

According to an embodiment of the present invention, the region that is formed in the oil pan and which faces the communicating hole is formed as a projecting portion projecting to the rear of the vehicle. Therefore, the engine as a whole can be made compact without the oil pan being made larger than is necessary. In addition, because the projecting portion is formed as the slope that descends to the storage chamber of the oil pan, the oil recovered from the projecting portion can be made to flow better, and thus oil recovery efficiency can be improved.

According to an embodiment of the present invention, the shift actuator is fastened and fixed to the crankcase cover covering a side of the crankcase, and is disposed so as to be located in the rear of the oil pan. Thus, the shift actuator is attached so as to be hidden in the rear of the oil pan, and can be prevented from projecting to the outside of the power unit.

According to an embodiment of the present invention, the shift actuator and the projecting portion are arranged so as to overlap each other as viewed from the side of the vehicle.

Thus, the shift actuator can be prevented from projecting to the outside of the power unit, and the projecting portion can protect the shift actuator.

According to an embodiment of the present invention, the baffle plate is located so as to cover the opening of the upper portion of the oil pan, and thereby suppresses inclination of an oil surface of the oil within the oil pan. Further, because the opening portion is formed in the baffle plate, a path for recovering the oil into the oil pan can be secured.

According to an embodiment of the present invention, the clamp member that can fix the harness of the shift actuator is jointly fastened to the oil pan fastening portion in the vicinity of the projecting portion. Thus, no special fixing member for fixing the clamp member needs to be provided. Therefore the structure for fixing the harness can be simplified.

According to an embodiment of the present invention, the main shaft of the gear speed change mechanism is located below the counter shaft, and the gear shifting device is disposed more rearwardly than the line connecting the axes of the main shaft and the counter shaft to each other. Thus, the gear shifting device is disposed in the lower rear portion of the power unit, so that a degree of freedom of arrangement of shaft members in the power unit can be secured.

According to an embodiment of the present invention, the communicating hole for recovering the oil can be used as a hole for inserting the gage portion of the oil amount checking device.

According to an embodiment of the present invention, parts around the shift actuator are arranged on the side of one end portion of the shift spindle, and the shift spindle sensor is disposed on the opposite side and is fastened and fixed to the clutch cover. Thus, the devices around the shift spindle are arranged in a distributed manner on both sides of the shift spindle. Therefore the gear shifting device can be made compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
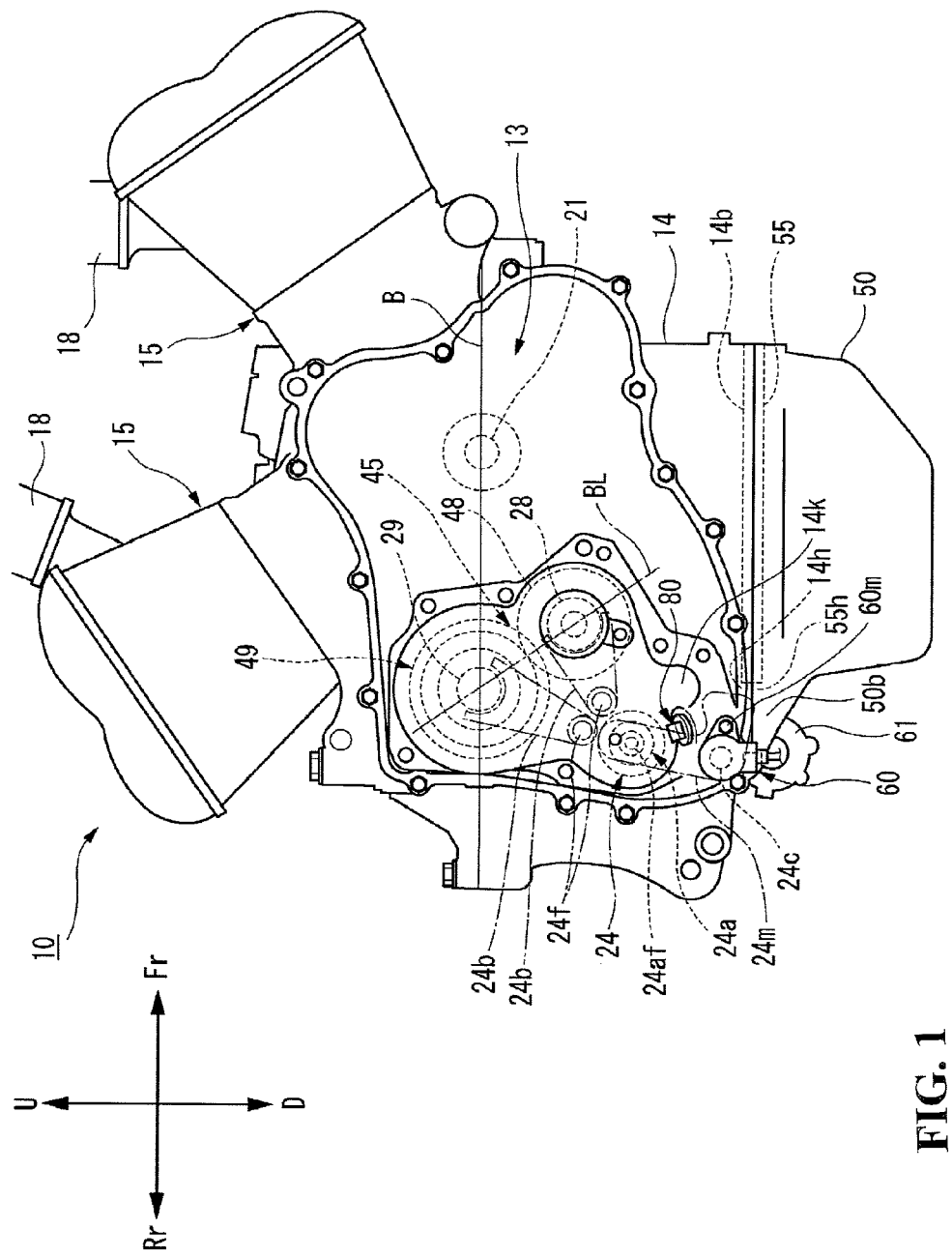
FIG. 1 is a schematic side view of a power unit according to the present invention.

A case where a power unit according to an embodiment of the present invention is applied to a motorcycle will hereinafter be described with reference to FIGS. 1 to 10. The drawings are to be viewed in the orientation of reference symbols. In the following description, a forward-rearward direction, a left-right direction, and an up-down direction are described in accordance with directions as viewed from an operator. In the drawings, a forward direction of the vehicle is denoted as Fr, a rearward direction of the vehicle is denoted as Rr, a left side of the vehicle is denoted as L, a right side of the vehicle is denoted as R, an upward direction of the vehicle is denoted as U, and a downward direction of the vehicle is denoted as D.

A power unit 10 according to the present embodiment is appropriately supported by a vehicle body frame (not shown) between a front wheel and a rear wheel. The power unit 10 in FIG. 1 includes an engine 13 disposed on the upper front side of the power unit 10; a gear speed change mechanism 45 having gear trains 48 and 49 for changing the speed of a rotational force of a crankshaft 21 with a gear shifting device 24 including at least a plate-shaped shift arm 24m rocking about a shift spindle 24c for performing gear pair changing operation on the gear speed change mechanism 45. A crankcase 14 is provided for housing the gear speed change mechanism 45 and the gear shifting device 24. An oil pan 50 is attached to a lower portion of the crankcase 14. In addition, the engine 13 in the present embodiment is for example a V-type engine having cylinder heads 15 arranged in the forward-rearward direction in the form of a V such that throttle bodies 18 are arranged on the inside.

Figure 2:
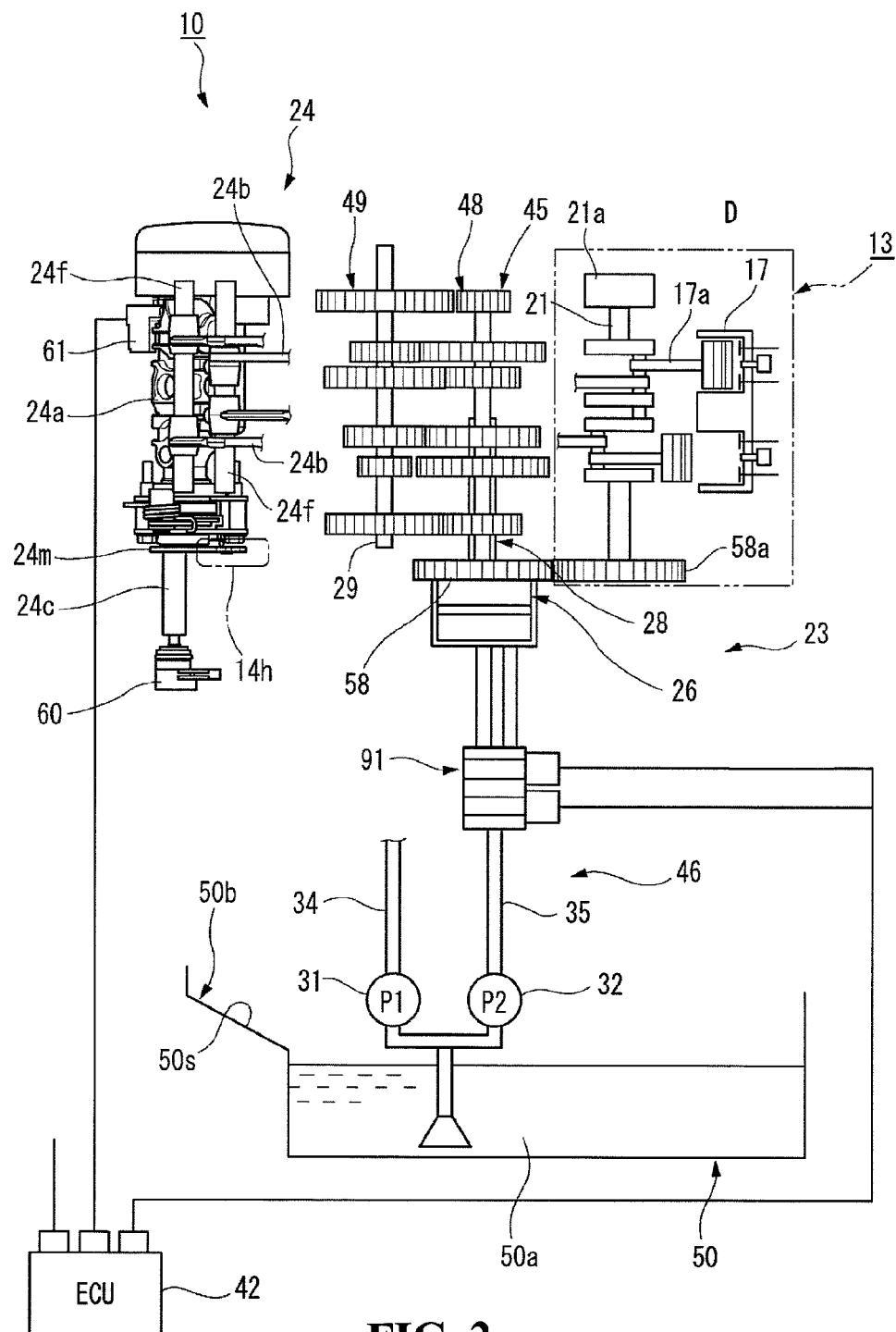
FIG. 2 is a schematic configuration diagram showing a general structure of the power unit according to the present invention.

As shown in FIG. 2, the engine 13 is formed by a triangular arrangement of three main shafts. More specifically, the crankshaft 21 is coupled to a piston 17 via a connecting rod 17a with a main shaft 28 being provided with a twin clutch 26 and parallel with the crankshaft 21, and a counter shaft 29. In addition, the axes of the crankshaft 21 and the counter shaft 29 are arranged on an upper-lower dividing plane B (see FIG. 1) that extends along the left-right direction of the vehicle and is substantially horizontal in the crankcase 14. The axis of the main shaft 28 is disposed below the upper-lower dividing plane B and more in a forward direction in the vehicle than the counter shaft 29. The gear shifting device 24 is disposed in the rear of and a lower portion of the crankcase 14.

The gear shifting device 24 is provided with a shift drum 24a, the shift spindle 24c, shift forks 24b, a shift actuator 61 that generates a gear shifting driving force, a power transmitting mechanism 62 for the shift actuator 61, and the like to be described later. In addition, the crankshaft 21 and the main shaft 28 are connected to each other via a primary drive gear 58a and a primary driven gear 58 as appropriate.

In addition, as shown in FIG. 2, the power unit 10 includes a twin clutch type transmission 23 connected to the engine 13 with an electronic control unit (ECU) 42 that performs actuation control of the twin clutch type transmission 23 and the gear shifting device 24. A hydraulic system 46 circulates oil collected in the oil pan 50. The hydraulic system 46 includes oil pumps 31 and 32 for feeding oil within a storage chamber 50a of the oil pan 50, oil feed paths 34, 35, 92a, and 92b, and a clutch actuator 91.

Figure 3:
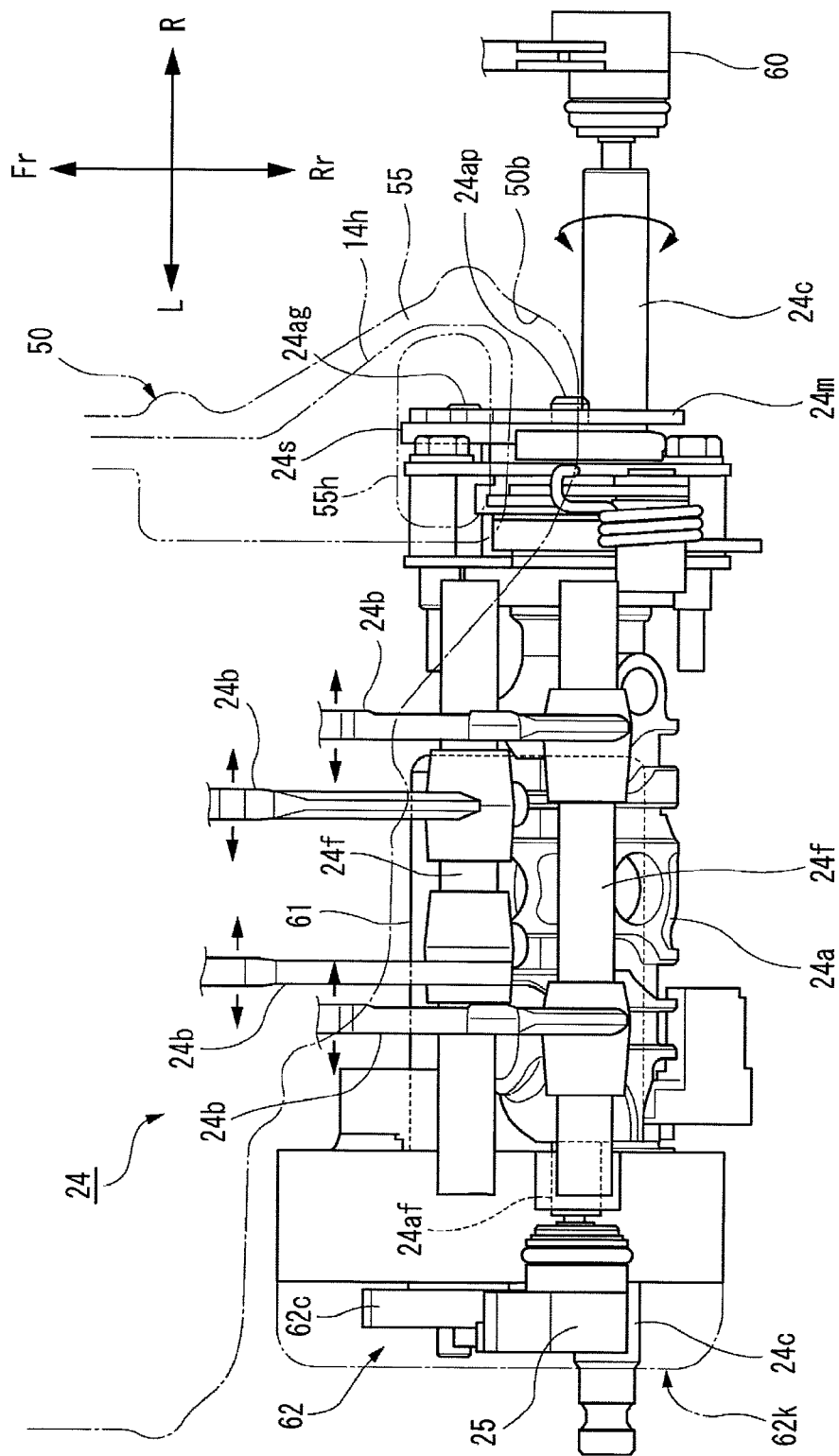
FIG. 3 is a fragmentary plan view of a gear shifting device in the power unit shown in FIG. 1.
Figure 4:
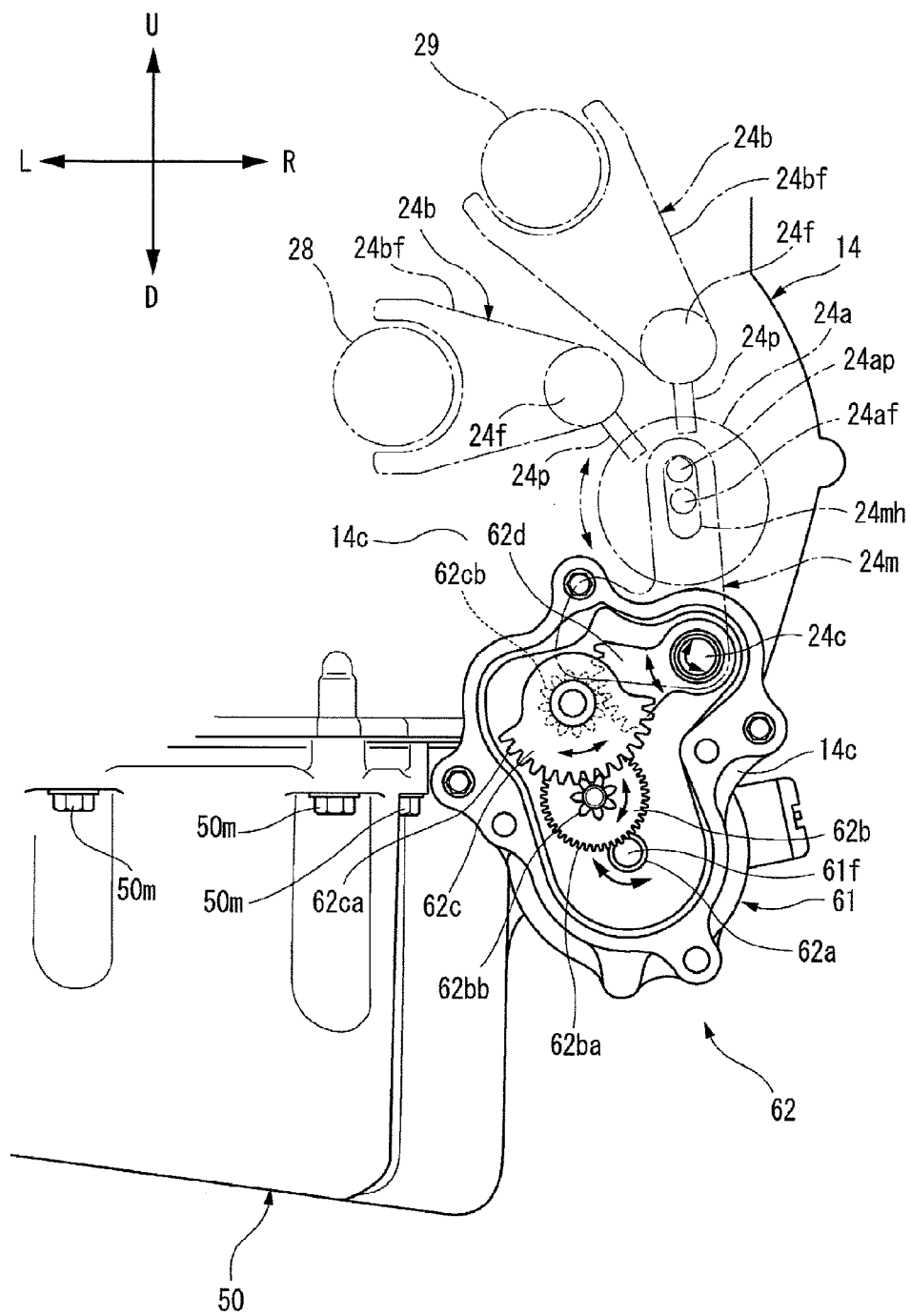
FIG. 4 is a fragmentary side view of a state in which a cover member is removed to show a driving force transmitting mechanism for the gear shifting device in the power unit shown in FIG. 1.

As shown in FIG. 3 and FIG. 4, the shift forks 24b of the gear shifting device 24 are arranged above the shift drum 24a so as to be supported by fork shafts 24f. Fork portions 24bf on one-end sides of the shift forks 24b are extended to the counter shaft 29 and the main shaft 28 and engaged with the gear trains. Engaging pins 24p on other-end sides of the shift forks 24b are engaged with peripheral grooves of the shift drum 24a. The shift forks 24b are supported so as to be slidable in an axial direction of the fork shafts 24f by the rotation of the shift drum 24a.

As shown in FIG. 4, which shows a state of a cover member 62k being removed, for the rotational force of the shift drum 24a, a driving force of the shift actuator 61 formed by a motor is transmitted via the power transmitting mechanism 62, the shift spindle 24c, and the shift arm 24m. More specifically, the power transmitting mechanism 62 is formed by a plurality of gears arranged between the shift actuator 61 and the shift spindle 24c. The gears include a first gear 62a provided around an actuator shaft 61f with a second gear 62b having an external gear 62ba meshing with the first gear 62a and a third gear 62c having an external gear 62ca meshing with an internal gear 62bb of the second gear 62b. A fourth gear 62d is provided for meshing with an internal gear 62cb of the third gear 62c. The fourth gear 62d is attached to a left side end portion of the shift spindle 24c.

Figure 5:
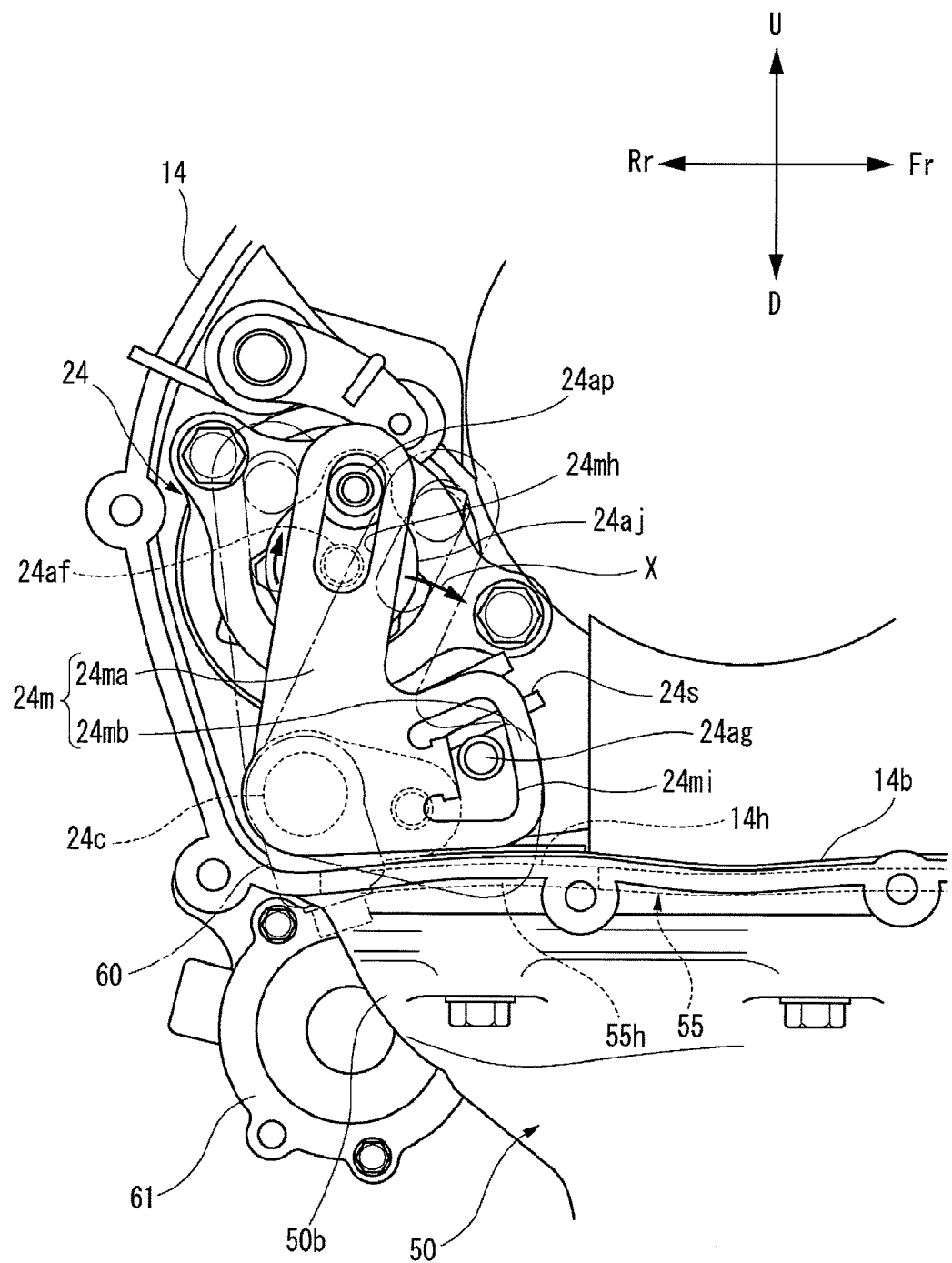
FIG. 5 is a fragmentary side view of the gear shifting device in the power unit shown in FIG. 1.

As shown in FIG. 4 and FIG. 5, the shift arm 24m is attached to a right side end portion of the shift spindle 24c. The shift arm 24m is a plate member in substantially the shape of an L, which plate member includes a first arm 24ma having a first opening 24mh engaging with a drum engaging pin 24ap provided to a drum arm 24af that rotates a drum shaft 24af of the shift drum 24a and a second arm 24mb having a second opening 24mi guided by a guide pin 24ag below the first arm 24ma. In addition, the shift spindle 24c is biased in a predetermined direction by a return spring 24s that is wound around the shift spindle 24c on the inside of the shift arm 24m and which has one end locked to the guide pin 24ag.

The second arm 24mb of the shift arm 24m extends substantially along a bottom portion 14b of the crankcase 14.

When the shift actuator 61 is driven, the shift spindle 24c is rotated, and the shift arm 24m is thus rocked. This rock causes the drum engaging pin 24ap engaging with the first opening 24mh of the first arm 24ma to rotate the drum shaft 24af, so that the shift drum 24a is rotated.

In addition, a shift position sensor 25 is disposed on the same axis as the drum shaft 24af of the shift drum 24a (see FIG. 3).

Figure 6:
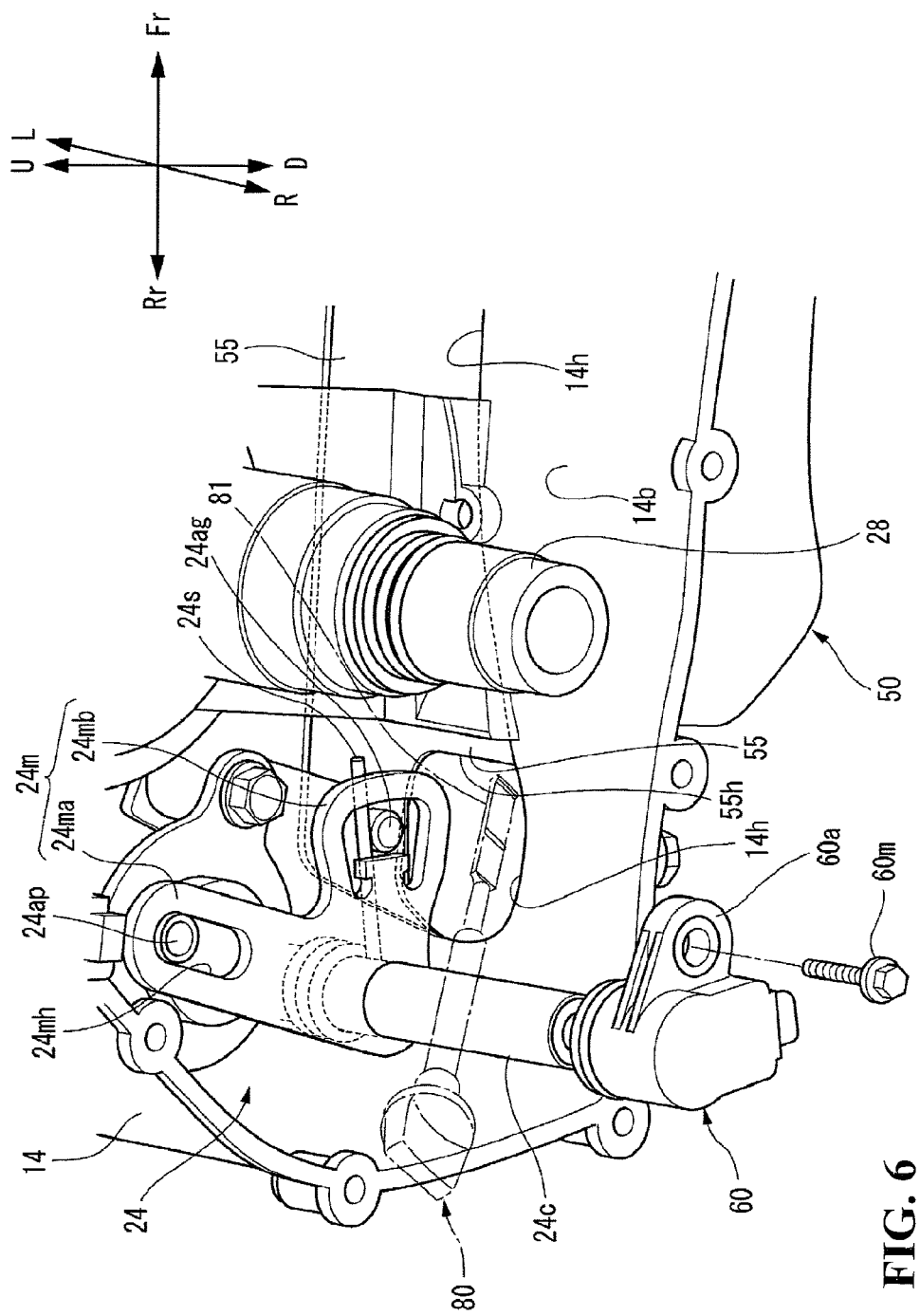
FIG. 6 is a schematic perspective view of a region surrounding a shift arm in the power unit shown in FIG. 1.

In addition, as shown in FIG. 6, a communicating hole 14h communicating with the oil pan 50 is formed in the bottom portion 14b of the crankcase 14 which bottom portion is situated below the shift arm 24m. More specifically, the communicating hole 14h that allows the shift arm 24m to rock is formed in the bottom portion 14b in proximity to the second arm 24mb of the shift arm 24m. A rocking range of the shift arm 24m extends through the communicating hole 14h to the inside of the oil pan 50. Thus, the communicating hole 14h and part of the rocking range of the shift arm 24m overlap each other.

In addition, a region of the oil pan 50 which region faces the communicating hole 14h is formed as a projecting portion 50b projecting rearwardly in the vehicle. The projecting portion 50b is formed as a slope 50s that gradually descends from a peripheral portion of the oil pan 50 to the storage chamber 50a in substantially a center of the oil pan 50.

Figure 8:
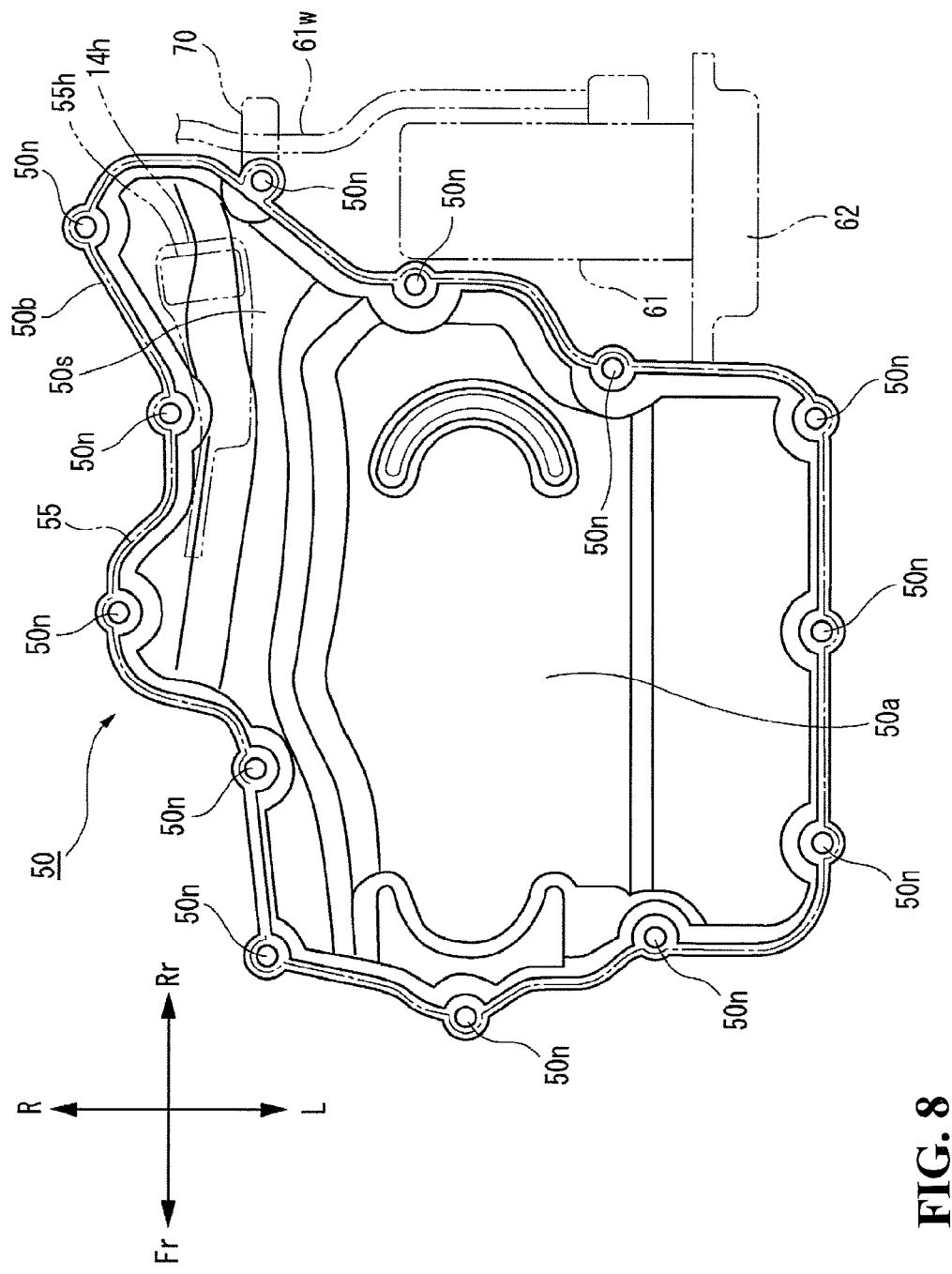
FIG. 8 is a plan view of an oil pan in the power unit shown in FIG. 1.

In addition, the shift actuator 61 is fastened and fixed to a crankcase cover 14c on the left side which crankcase cover covers a side of the crankcase 14 so as to be located in the rear of the oil pan 50. In addition, as viewed from above the vehicle, as shown in FIG. 8, the shift actuator 61 and the projecting portion 50b are arranged so as to be substantially side by side in a width direction of the vehicle. In addition, as viewed from the side of the vehicle, as shown in FIG. 1 and FIG. 5, the shift actuator 61 and part of the projecting portion 50b are arranged so as to overlap each other.

As shown in FIG. 8, a plate-shaped baffle plate 55 covering a ceiling surface of the oil pan 50 is provided in an upper surface portion of the oil pan 50. More specifically, between the oil pan 50 and the bottom portion 14b of the crankcase 14. An opening portion 55h opening in such a range as to overlap the communicating hole 14h is formed in the baffle plate 55.

Figure 9:
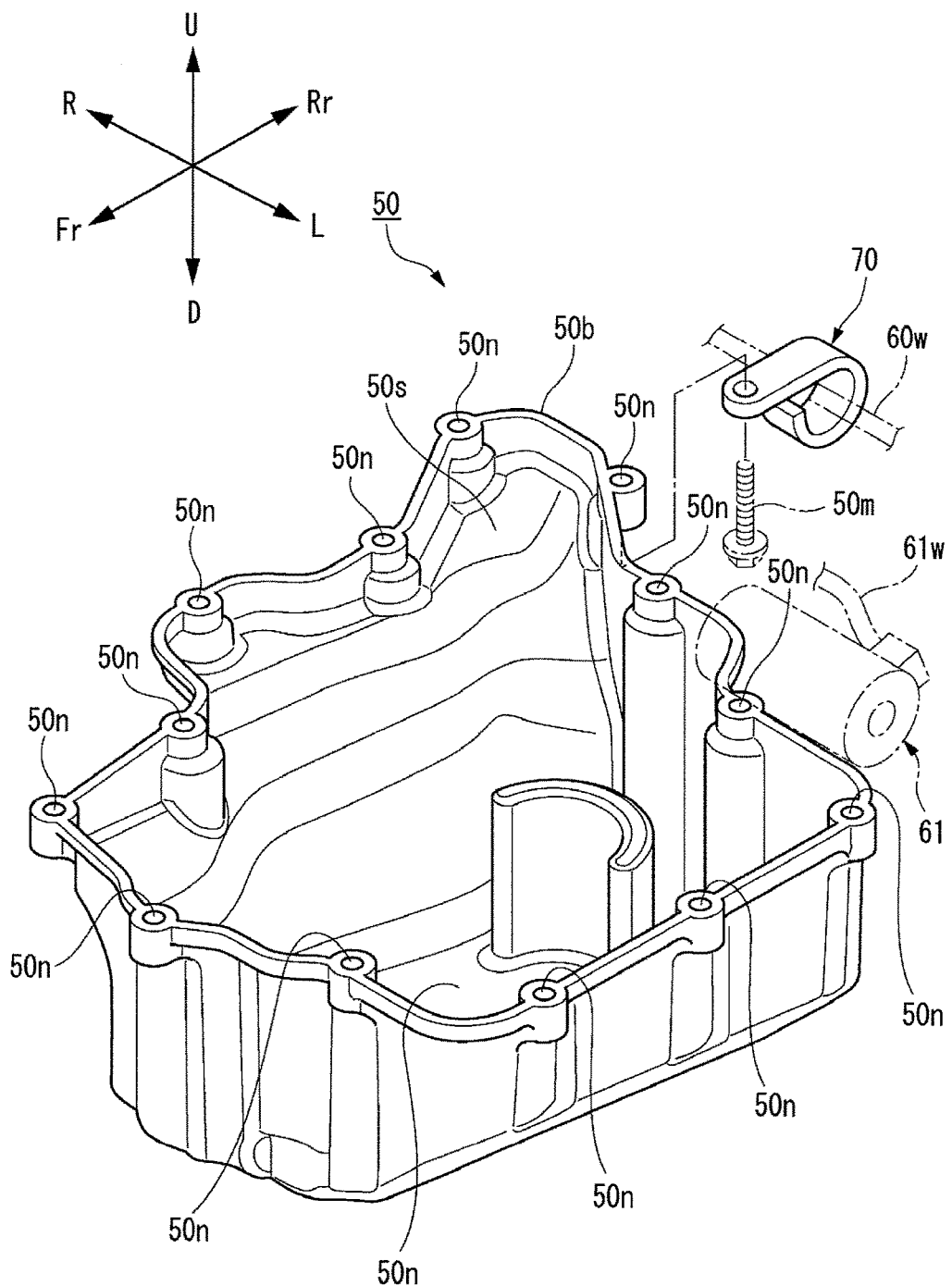
FIG. 9 is a schematic perspective view of the oil pan in the power unit shown in FIG. 1.
Figure 10:
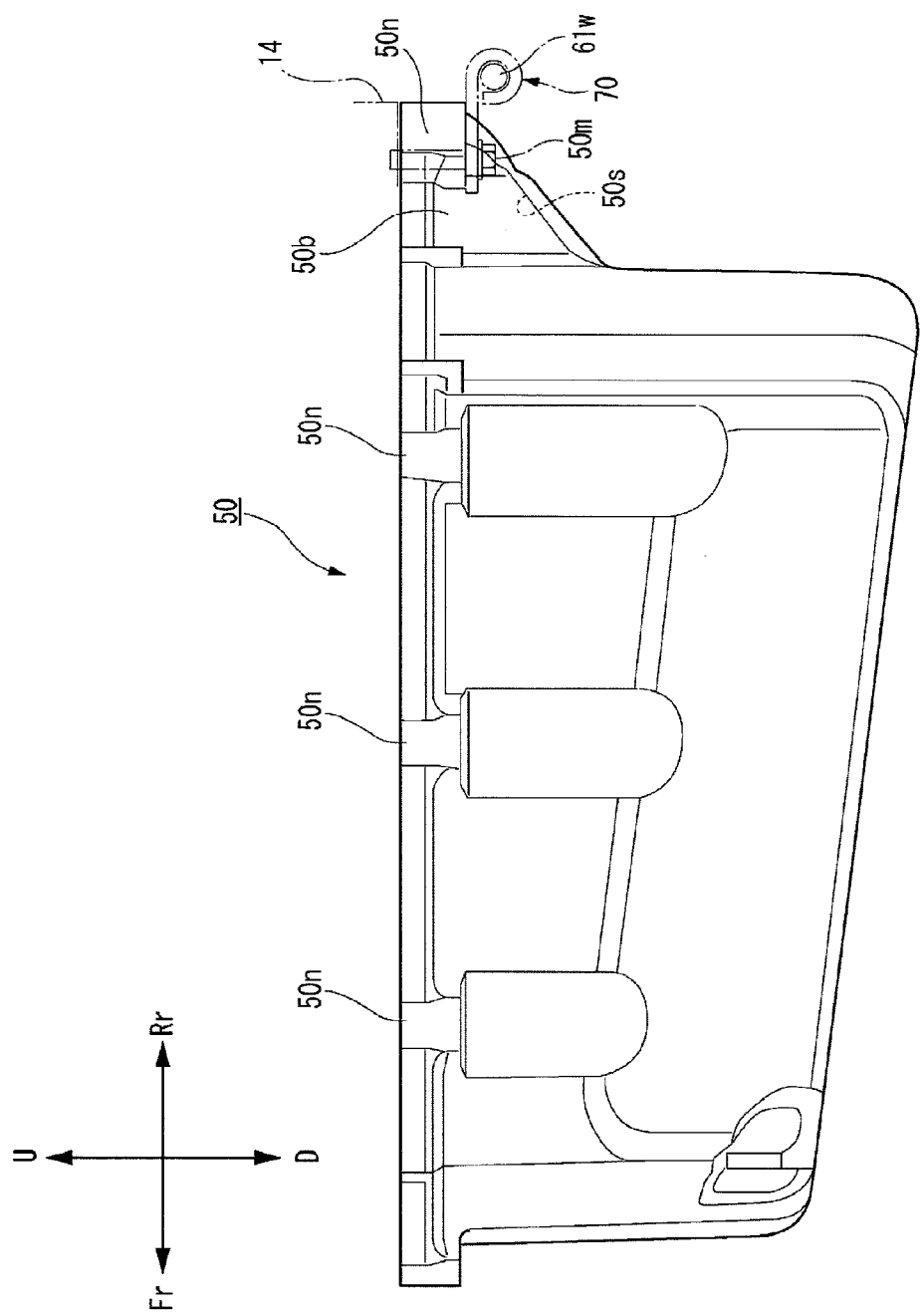
FIG. 10 is a side view of the oil pan in the power unit shown in FIG. 1.

In addition, as shown in FIG. 8, FIG. 9, and FIG. 10, a clamp member 70 that fixes a harness 61w of the shift actuator 61 is provided in an oil pan fastening portion 50n in the vicinity of the projecting portion 50b. A fastening screw for fixing the oil pan 50 to the crankcase 14 is used as a fastening screw 50m that fixes the clamp member 70. The clamp member 70 is thus jointly fastened together with the oil pan 50.

Figure 7:
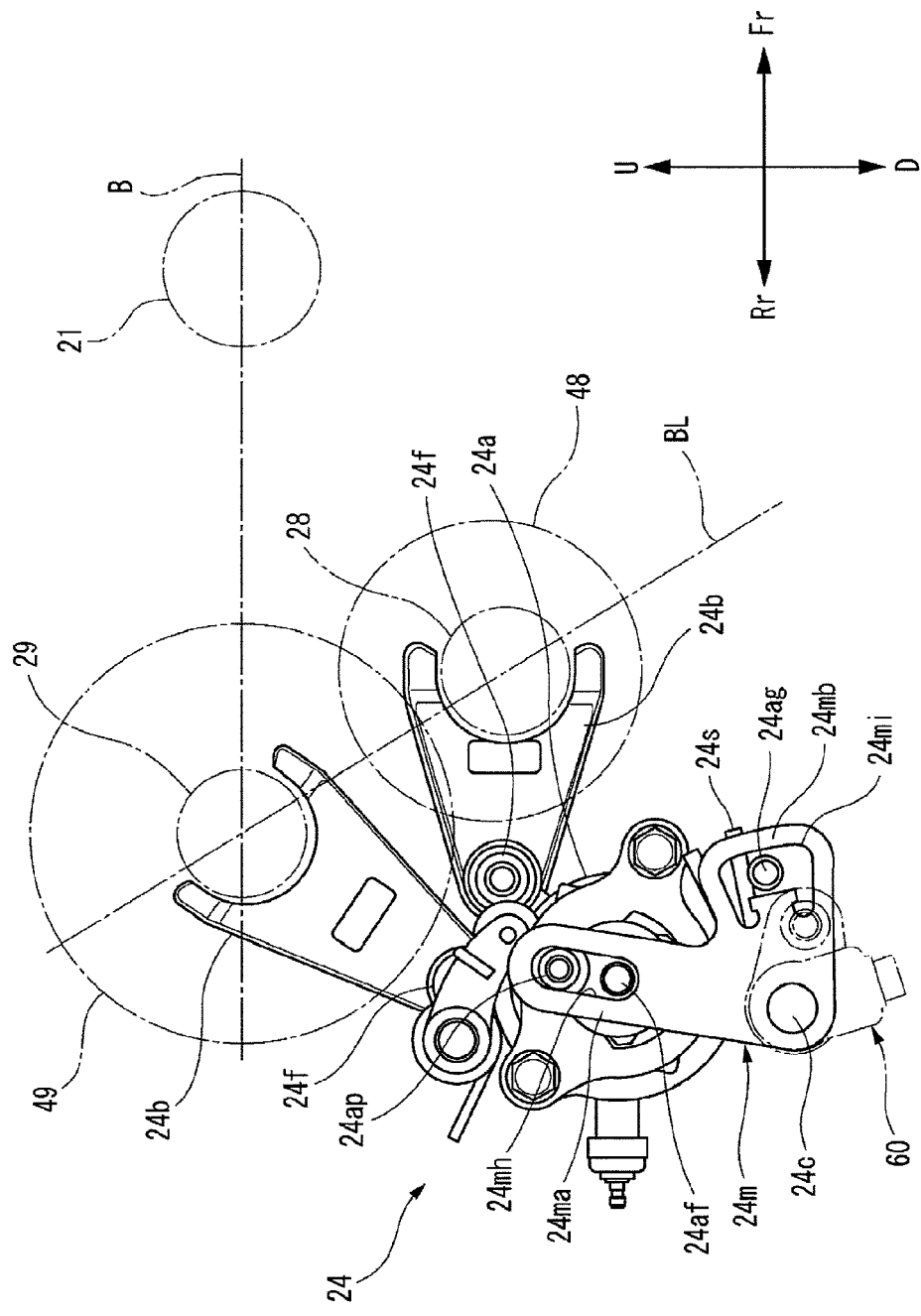
FIG. 7 is a fragmentary side view for showing an arrangement relation between the gear shifting device and a gear mechanism in the power unit shown in FIG. 1.

In addition, as described above, the axes of the crankshaft 21 and the counter shaft 29 are disposed on the upper-lower dividing plane B (see FIG. 1) that is substantially horizontal in the crankcase 14, and the axis of the main shaft 28 is disposed below the upper-lower dividing plane B and more in a frontward direction in the vehicle than the counter shaft 29. To describe this more concretely, as shown in FIG. 7, the gear shifting device 24 is disposed more rearwardly in the vehicle than a line BL connecting the axes of the main shaft 28 and the counter shaft 29 to each other.

Further, in the present embodiment, an oil amount checking device 80 is attached to a clutch cover 14k (see FIG. 1) provided on the right side of the vehicle, for example. As shown in FIG. 6, a gage portion 81 of the oil amount checking device 80 is inserted through the communicating hole 14h and the opening portion 55h of the baffle plate 55 into the oil stored on the inside of the oil pan 50, so as to be able to detect the amount of the oil.

In addition, in the present embodiment, a shift spindle sensor 60 is coupled to the shift spindle 24c to which the driving force of the shift actuator 61 is transmitted via the power transmitting mechanism 62 as described above. The shift spindle sensor 60 is located further outwardly than the shift arm 24m is disposed on the opposite side (right side of the vehicle) from the power transmitting mechanism 62. An attaching portion 60a of the shift spindle sensor 60 is fastened and fixed to the clutch cover 14k covering one end side of the crankcase 14 by a sensor fastening screw 60m.

Thus, in the present embodiment, the communicating hole 14h communicating with the oil pan 50 is formed in the bottom portion 14b of the crankcase 14 which bottom portion is located below the shift arm 24m, and the rocking range of the shift arm 24m partly overlaps the communicating hole 14h. Therefore the gear shifting device 24 can be disposed nearer to the bottom portion 14b of the crankcase 14. Thus, the effect of the arrangement of the gear shifting device 24 on the gear speed change mechanism 45, the engine 13, and the like can be reduced, so that a degree of freedom of arrangement of the gear speed change mechanism 45 and the engine 13 can be improved.

In addition, in the present embodiment, the region that is formed in the oil pan 50 and which faces the communicating hole 14h is formed as the projecting portion 50b projecting rearwardly of the vehicle. Therefore, the engine as a whole can be made compact without the oil pan 50 being made larger than is necessary. In addition, because the projecting portion 50b is formed as the slope 50s that descends to the storage chamber 50a of the oil pan 50, the oil recovered from the projecting portion 50b can be made to flow better. Thus, the oil recovery efficiency can be improved.

Further, in the present embodiment, the shift actuator 61 is fastened and fixed to the crankcase cover 14c covering a side of the crankcase 14, and is disposed so as to be located in the rear of the oil pan 50. Thus, the shift actuator 61 is attached so as to be hidden in the rear of the oil pan 50, and can be prevented from projecting to the outside of the power unit 10.

In addition, in the present embodiment, the shift actuator 61 and the projecting portion 50b are arranged so as to overlap each other as viewed from the side of the vehicle. Thus, the shift actuator 61 can be prevented from projecting to the outside of the power unit 10, and the projecting portion 50b can protect the shift actuator 61.

In addition, in the present embodiment, the baffle plate 55 is located so as to cover the opening of the upper portion of the oil pan 50, and thereby suppresses inclination of an oil surface of the oil within the oil pan 50. Further, because the opening portion 55h is formed in the baffle plate 55, a path for recovering the oil into the oil pan 50 can be secured.

In addition, in the present embodiment, the clamp member 70 that can fix the harness 61w of the shift actuator 61 is jointly fastened to the oil pan fastening portion 50n in the vicinity of the projecting portion 50b. Thus, no special fixing member for fixing the clamp member 70 needs to be provided. Therefore the structure for fixing the harness 61w can be simplified.

In the present embodiment, the main shaft 28 of the gear speed change mechanism 45 is located below the counter shaft 29 with the gear shifting device 24 being disposed more rearwardly than the line BL connecting the axes of the main shaft 28 and the counter shaft 29 to each other. Thus, the gear shifting device 24 is disposed in the lower rear portion of the power unit 10, so that a degree of freedom of arrangement of shaft members in the power unit 10 can be secured.

In addition, in the present embodiment, the communicating hole 14h for recovering the oil can be used as a hole for inserting the gage portion 81 of the oil amount checking device 80.

In addition, in the present embodiment, parts around the shift actuator 61 are arranged on the side of one end portion of the shift spindle 24c, and the shift spindle sensor 60 is disposed on the opposite side and is fastened and fixed to the clutch cover 14k. Thus, the devices around the shift spindle 24c are arranged in a distributed manner on both sides of the shift spindle 24c. Therefore the gear shifting device 24 can be made compact.

One embodiment of the present invention has been described above. However, the present invention is not limited to this, but can be changed as appropriate. For example, the shift actuator may also serve as a clutch actuator, which is a power source for clutch connecting and disconnecting operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit comprising:
an engine;
a gear speed change mechanism having a plurality of gear pairs to change a speed of rotation of a crankshaft;
a gear shifting device including at least a plate-shaped shift arm rocking about a shift spindle to perform a gear pair changing operation on the gear speed change mechanism;
a crankcase housing the gear speed change mechanism and the gear shifting device; and
an oil pan attached to a lower portion of the crankcase, said oil pan including a projecting portion projecting rearwardly of a vehicle with the projecting portion including a slope portion that descends to a storage chamber of the oil pan; and
a communicating hole formed in the lower portion of the crankcase for communicating with the oil pan, said communicating hole being formed above the projecting portion of the oil pan and being located below the shift arm wherein the shift arm partly enters the communicating hole formed above the projecting portion of the oil pan during rocking movement of the shift arm.

2. The power unit according to claim 1, further comprising:
a shift actuator transmitting a driving force to the shift spindle;
wherein the shift actuator is fastened and fixed to a crankcase cover covering a side of the crankcase, and is disposed in a rear of the oil pan.

3. The power unit according to claim 2, wherein a clamp member fixing a harness of the shift actuator is jointly fastened to an oil pan fastening portion in a vicinity of the projecting portion.

4. The power unit according to claim 1, further comprising:
a plate-shaped baffle plate covering a ceiling surface of the oil pan;
an opening formed in the plate-shaped baffle plate wherein said opening is in communication with the communicating hole formed in the lower portion of the crankcase.

5. The power unit according to claim 1, wherein a main shaft of the gear speed change mechanism is located below a counter shaft; and
the gear shifting device is disposed to a rear of the power unit relative to a line connecting axes of the main shaft and the counter shaft.

6. The power unit according to claim 1, wherein an oil amount checking device is attached to a clutch cover, and a gage portion of the oil amount checking device is inserted into the communicating hole.

7. The power unit according to claim 6, wherein the shift actuator transmits a driving force to one end portion of the shift spindle via a power transmitting mechanism, a shift spindle sensor is coupled to another end portion of the shift spindle, and the shift spindle sensor is fastened and fixed to the clutch cover covering one end side of the crankcase.

8. A power unit comprising:
a gear speed change mechanism having a plurality of gear pairs;
a gear shifting device including at least a plate-shaped shift arm rocking about a shift spindle for performing a gear pair changing operation on the gear speed change mechanism;
a crankcase housing the gear speed change mechanism and the gear shifting device;
an oil pan attached to a lower portion of the crankcase, said oil pan including a projecting portion projecting rearwardly of a vehicle with the projecting portion including a slope portion that descends to a storage chamber of the oil pan; and
a communicating hole being formed in a lower portion of the crankcase, said communicating hole being formed above the projecting portion of the oil pan and being in communication with the oil pan with the communicating hole being located below the shift arm wherein the shift arm partly enters the communicating hole formed above the projecting portion of the oil pan during rocking movement of the shift arm.

9. The power unit according to claim 8, further comprising:
a shift actuator transmitting a driving force to the shift spindle;
wherein the shift actuator is fastened and fixed to a crankcase cover covering a side of the crankcase, and is disposed in a rear of the oil pan.

10. The power unit according to claim 8, further comprising:
a plate-shaped baffle plate covering a ceiling surface of the oil pan;
an opening formed in the plate-shaped baffle plate wherein said opening is in communication with the communicating hole formed in the lower portion of the crankcase.

* * * * *